Feb. 24, 1925.
R. R. HALL
1,527,866
PIPE HOLDING AND TURNING MEANS
Filed July 31, 1922
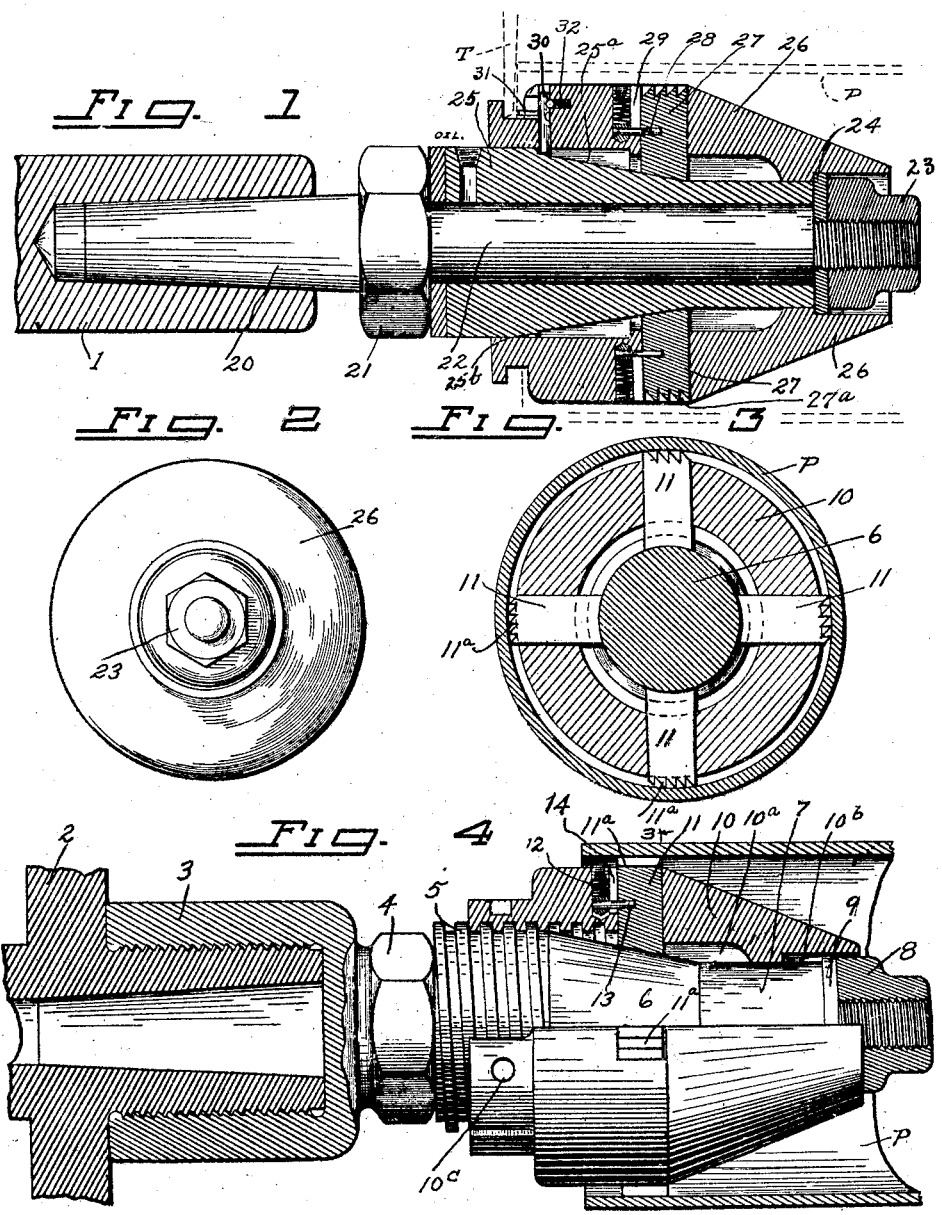
INVENTOR.
RALPH R. HALL
HIS ATTORNEY.

Patented Feb. 24, 1925.

1,527,866

UNITED STATES PATENT OFFICE.

RALPH R. HALL, OF LONG BEACH, CALIFORNIA, ASSIGNOR TO SAID HALL, CHESTER A. RASMUSSEN, AND WM. A. TROUT, ALL OF LONG BEACH, CALIFORNIA.

PIPE HOLDING AND TURNING MEANS.

Application filed July 31, 1922. Serial No. 578,835.

*To all whom it may concern:*

Be it known that I, RALPH R. HALL, a citizen of the United States, residing in the city of Long Beach, county of Los Angeles, and State of California, have invented certain new and useful Improvements in Pipe Holding and Turning Means, of which the following is a specification.

My invention relates to means for receiving, holding and turning pipe and tubing of different sizes while it is being worked on. The work may be to slightly countersink the insides of the ends of the pipe, to thread the outside of the ends, or to cut the pipe. The principal object of my invention is to provide a machine or device which will so grip and hold a length of pipe and turn the same that the ends of the pipe will be accessible for such treatment as it may be desired to give it.

Another object of my invention is to provide in such a device means for centering the pipe so that it will turn true, said means being adapted to grip and turn the pipe placed thereon.

In order to fully explan my invention, I have shown it in a practical embodiment on the accompanying sheet of drawings, which I will now describe.

Figure 1 is a longitudinal sectional view through the tail stock means for receiving one end of the pipe;

Figure 2 is a right hand end view of Fig. 1, with structure complete;

Figure 3 is a cross, vertical sectional view taken on line 3—3 of Fig. 4; and

Figure 4 is a longitudinal sectional view through the head stock means for receiving, holding and turning a pipe section.

Referring in detail to the drawings, 1, designates the tail stock of a lathe, or similar machine for handling pipe sections, and 2 the head stock thereof, the turning power being applied through the head stock in the usual manner.

In developing my invention, I provide pipe holding means for the head stock and for the tail stock which are similar in many respects, but which differ in some important details.

Referring first to Figs. 4 and 3, I will describe the head stock means for receiving, holding and turning a pipe section. The body comprises the internally threaded portion 3, the nut portion, 4, the threaded portion, 5, the conical portion, 6, the uniformly round portion, 7, and the nut, 8, a washer, 9, being interposed between the nut 8 and the portion 7, as shown. Mounted on the body is an outer conical member 10, internally threaded at its large end to turn on the threaded portion 5 of the body, as shown, the interior of said conical member 10 being enlarged, as at $10^a$ and $10^b$ to move over the conical portion 6, and the washer 9, as clearly shown in the sectional view, Fig. 4. Mounted in said conical member 10 are four radially disposed gripping jaws 11, 11, with their inner ends bearing on the conical portion 6 and their outer ends provided with teeth, $11^a$ and adapted to grip the inside of a pipe P, placed thereover, as shown in Figs. 3 and 4. Seated in said conical member 10, are spring-pressed plunger elements 12, having pins, 13, working through slots, 14, and engaging with said jaws 11, for the purpose of normally holding said jaws in place and at the same time allowing them to be forced outwardly by the conical portion 6, when said body is turned into said outer conical member 10. Said outer conical member 10, is also provided with holes or sockets, $10^c$ to receive a tool for holding the same, or for turning the same relative to the threaded portion 5, as will be readily understood from the drawings.

Referring now to Figs. 1 and 2, the tail stock device comprises a body with a shank 20, to fit into the tail stock, a nut portion 21, and a shaft 22, with nut 23 and washer 24. Mounted on the shaft portion 22, is a sleeve member, 25, having a conical external portion, $25^a$. Mounted on said sleeve 25, is an outer conical member 26, provided with radially disposed jaws, 27, mounted therein and yieldingly held in place by means of spring-pressed pins, 28, working in slots 29, cut in the body of the member 26, as clearly indicated. Said jaws 27 are also provided on their outer ends with teeth, $27^a$ disposed circumferentially of the conical member 26, whereby to grip the inside of a pipe section placed thereon and hold it against longitudinal movement over the tools. The inner ends of said jaws bear on the conical surface of the sleeve 25, as shown, whereby as said tail stock is moved toward the pipe, the movement of the conical sleeve 25 will operate to force the jaws 27 outwardly into the pipe, shown in place in light dotted lines. The conical member 26 is provided at its rear or larger end with an annular channel, 26ª, whereby a tool, as at T, can be inserted therein, against the end of the pipe, P, for the purpose of preventing the conical member 26, from being pushed too far into the end of the pipe as the tail stock is moved up into place to hold the pipe, which movement also forces the shaft portion 22 and sleeve 25 into the conical member 26, being held by said tool. Thus the jaws 27 are forced outwardly into holding position as the tail stock is moved up into place and made secure.

The pipe is handled by swinging cranes or other lifting means and as swung into place over the machine, one end is readily guided over the head stock and conical member 10, and the other end is guided over the conical member 26, of the tail stock, or in position so that as said tail stock is moved up to it, said conical member 26 enters the end of the pipe, the conical shape of said members making it much easier to put the pipe in place. It will be seen as the parts are secured in place, the gripping jaws are inwardly from the ends of the pipe, leaving the ends of the pipe free to be worked on, either on their inner or outer sides, as may be desired. Any suitable lathe tool can be used thereon as the pipe is thus held and turned, and the pipe can be quickly handled, secured in place and again removed. As the jaws are moved out into engagement with the pipe, they operate to center the pipe and to grip it and hold it firmly. It will be noted that the pipe is thus centered from the inside and not from the outside and is more accurately centered, for it often happens that a pipe is thicker on one side than on another. Another advantage is that the entire outside surface of the pipe is free to be worked on.

Referring to Fig. 1, I have provided a stop pin, 30, set in the rear end of the member 26, with a lateral pin 31 projecting therefrom, and with a spring-pressed locking means, 32, to hold said stop pin in either of two positions, as indicated by the notches therein. This stop pin is for the purpose of holding the head 26 from being accidentally moved should the pipe strike the conical part of it, that is, when the pipe is being placed over the stock and before it is in place for the jaws to be moved outwardly to center and hold the pipe, the pipe sometimes strikes the stock and would cause it to be moved over the sleeve 25, were it not for the stop pin 30. The stop pin is raised by means of the lateral pin 31, and is held in place by the spring-pressed plunger 32, out of the way.

I am aware that changes can be made in the details of my invention without departing from the spirit thereof and I do not, therefore, limit the invention to the showing made, except as I may be limited by the hereto appended claims.

I claim:

1. In a device of the character shown and described, an inner member having two cylindrical portions of different sizes with a conical portion therebetween, an outer member having a cylindrical portion and a conical portion and adapted to fit over said inner member, radial holding jaws through the cylindrical portion of said outer member, with their inner ends engaging the conical portion of the inner member, whereby when said outer and inner members are moved relative to each other said holding jaws are operated, the conical portion of said outer member moving over the outer and smaller cylindrical portion of the inner member, substantially as described.

2. In a device of the character referred to, an inner member having a cylindrical threaded portion, a conical portion and a smaller cylindrical portion, an outer member having a cylindrical portion threaded over the threaded cylindrical portion of said inner member and having a conical portion over the smaller cylindrical portion of said inner member, radial holding jaws through the cylindrical portion of said outer member with their inner ends bearing on the conical portion of said inner member, whereby when said outer and inner members are turned relative to each other and moved by said threads longitudinally of each other said holding jaws are moved radially in said outer member.

3. In a pipe holding a turning mechanism, an inner supporting member having a larger and a smaller cylindrical portion with a conical portion therebetween, tapering from to the other, an outer member having a cylindrical portion fitting over the larger cylindrical portion of said inner member and having a conical portion forming the outer end of said mechanism, whereby to more easily be inserted into the end of a pipe, radial holding jaws through the outer member with their inner ends bearing on the conical portion of said inner member and operable thereby when said outer and inner members are moved relatively, the inside of the conical portion of said outer member having a sliding fit over the smaller cylindrical portion of said inner member and being internally enlarged to move over the conical part of said inner member, to permit movement relatively of said outer member over said inner member, and means for supporting and turning said inner members, substantially as described.

Signed at Los Angeles, Los Angeles County, California, this 26th day of July, 1922.

RALPH R. HALL.

Witnesses:
W. R. LITZENBERG,
ARTHUR J. HUGHES.